(12) United States Patent
Hashimoto

(10) Patent No.: US 9,931,881 B2
(45) Date of Patent: Apr. 3, 2018

(54) APPARATUS FOR TURNING PAGES OF A BOOK AND METHOD FOR SAME

(71) Applicant: CASIO COMPUTER CO., LTD., Shibuya-ku, Tokyo (JP)

(72) Inventor: Jun Hashimoto, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/156,982

(22) Filed: May 17, 2016

(65) Prior Publication Data

US 2016/0347107 A1 Dec. 1, 2016

(30) Foreign Application Priority Data

Jun. 1, 2015 (JP) ................ 2015-111189

(51) Int. Cl.
*B42D 9/04* (2006.01)
*H04N 5/225* (2006.01)
*H04N 5/232* (2006.01)

(52) U.S. Cl.
CPC ............. *B42D 9/04* (2013.01); *H04N 5/225* (2013.01); *H04N 5/23206* (2013.01); *H04N 5/23241* (2013.01)

(58) Field of Classification Search
CPC ...................................................... B42D 9/04
See application file for complete search history.

(56) References Cited

U.S. PATENT DOCUMENTS

| 4,553,467 A * | 11/1985 | Goldner | B42D 9/04 84/487 |
| 8,646,193 B1 * | 2/2014 | Li | B42D 9/06 40/533 |
| 2014/0078561 A1 * | 3/2014 | Hasegawa | H04N 5/232 358/474 |
| 2014/0168726 A1 * | 6/2014 | Hasegawa | B42D 9/06 358/479 |
| 2014/0366412 A1 * | 12/2014 | Hasegawa | B42D 9/04 40/530 |
| 2015/0375557 A1 * | 12/2015 | Hasegawa | B42D 9/04 358/498 |

FOREIGN PATENT DOCUMENTS

JP 2015003446 A 1/2015

* cited by examiner

*Primary Examiner* — Gary C Hoge
(74) *Attorney, Agent, or Firm* — Holtz Holtz & Volek PC

(57) ABSTRACT

An arm motor control section controls the operation of an arm motor that drives an arm section for turning a page of a book by pressing an adhesion roller against the page, and a current detection section outputs a current limit notice upon detecting an overcurrent in the arm motor which is limited by a limiter. When a current limit notice is outputted in a page turning operation, a CPU drives and controls the arm motor to perform reverse rotation by the arm motor control section, and thereby controls a pressing period that is a locking period during which the adhesion roller is pressing the page.

8 Claims, 7 Drawing Sheets

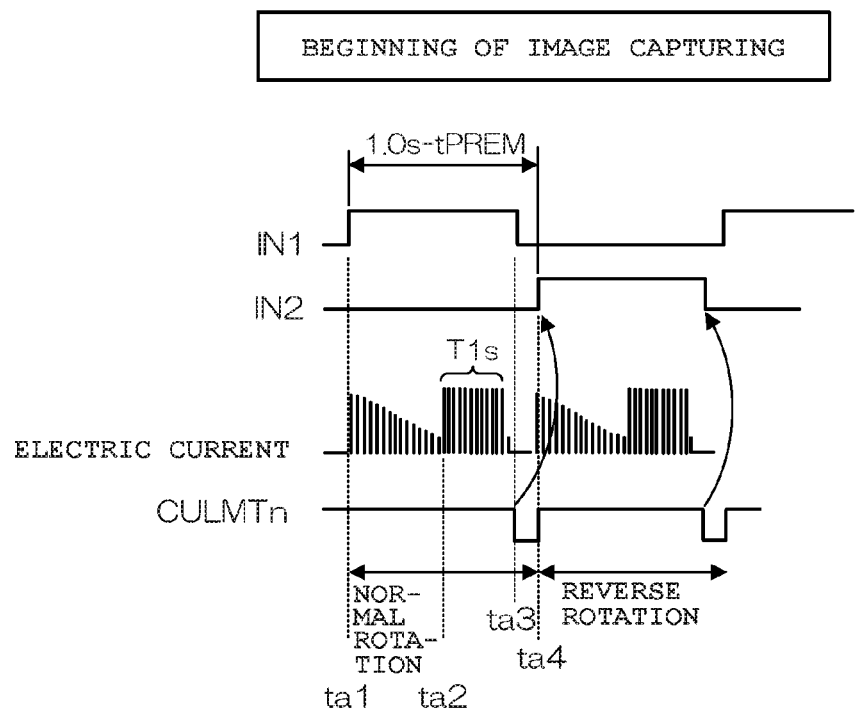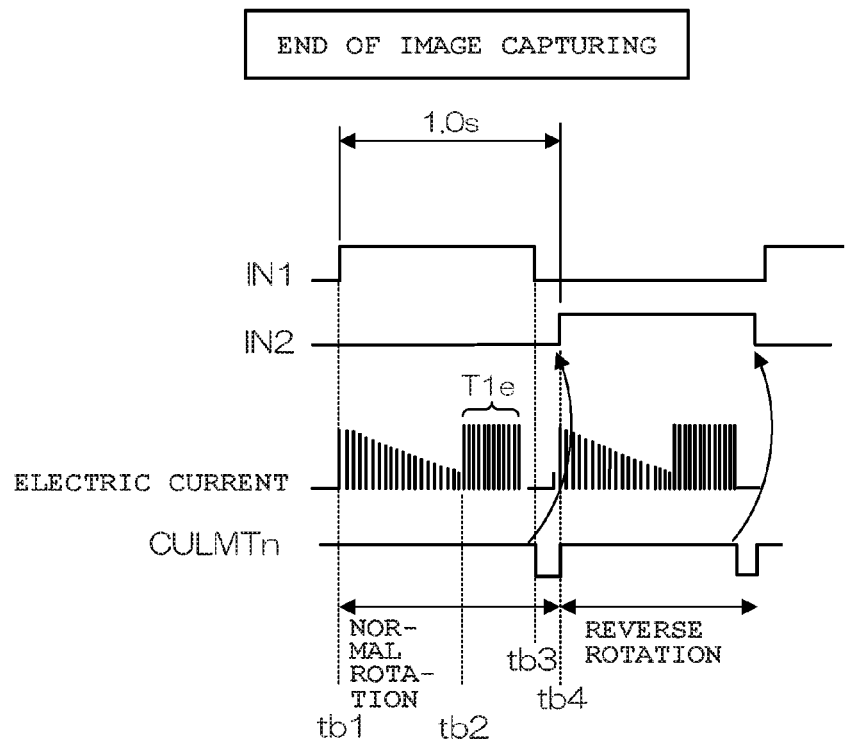

PRIOR ART

APPARATUS FOR TURNING PAGES OF A BOOK AND METHOD FOR SAME

CROSS-REFERENCE TO RELATED APPLICATION

This application is based upon and claims the benefit of priority from the prior Japanese Patent Application No. 2015-111189, filed Jun. 1, 2015, the entire contents of which are incorporated herein by reference.

BACKGROUND OF THE INVENTION

1. Field of the Invention

The present invention relates to an apparatus for turning pages of a book, and a method for the same.

2. Description of the Related Art

Conventionally, a page turning apparatus is known which automatically turns pages of a book so that each page is photographed for book digitalization without the book being cut (for example, refer to Japanese Patent Application Laid-open (Kokai) Publication No. 2015-003446). In the mechanism of the page turning apparatus, an adhesion roller attached to an end portion of its arm is pressed against and adheres to a page of a book, and the page adhered to the adhesion roller is turned over by the rotational movement of the arm. By repeating this page turning operation by the rotational movement of the arm, the page turning apparatus turns the pages of the book one by one. Then, by photographing an unturned page by an imaging apparatus every time a page of the book is turned over, the page turning apparatus stores images of the pages of the whole book.

FIG. 6A, FIG. 6B, and FIG. 6C are schematic diagrams for describing a page turning operation by a general page turning apparatus. As shown in FIG. 6A, for an arm section 1 of this page turning apparatus, movable range A has been set such that the arm section 1 makes reciprocating motions between book stands 2-1 and 2-2. Also, a start point SP has been set on the book stand 2-2 side, and a return point HP has been set on the book stand 2-1 side. Here, a book 3 is fixed on the book stand 2-1 side of the page turning apparatus, as shown in FIG. 6B.

First, the arm section 1 is driven and rotated from the start point SP toward the return point HP side, and then an adhesion roller 4 attached to an end of the arm section 1 comes in contact with a page of the book 3. Here, the pressed page adheres to the adhesion roller 4. In addition, the arm section 1 is forcibly stopped distance B short of the return point RP by unturned page of the book 3, since it has been structured to make reciprocating motions within movable range A.

Next, when the arm section 1 is rotated toward the book stand 2-2 side, the page adhering to the adhesion roller 4 is turned over. Then, when the adhering page comes to the book stand 2-2 side along with the rotation of the arm section 1, it is removed from the adhesion roller 4 by the rotation of the adhesion roller 4 and the wind from an assist fan not shown, and guided to the book stand 2-2 side.

By this reciprocating motion of the arm section 1 between the book stands 2-1 and 2-2 pages on the book stand 2-1 side are turned over one by one toward the book stand 2-2 side. Also, by a page of the book being photographed by a tablet (smartphone) or the like every time a page is turned over, images of the respective pages of the book are captured.

In the beginning of the image capturing, there remain uncaptured pages on the book stand 2-1 side, so that the adhesion roller 4 is stopped at adhesion point AP1 based on the number of the remaining pages (thickness)), as shown in FIG. 6B. On the other hand, when the image capturing is ended, since there are no uncaptured pages on the book stand 2-1 side, the adhesion roller 4 is stopped at adhesion point AP2, as shown in FIG. 6C. That is, in the beginning and end of the image capturing, movable range A of the arm section 1 is restricted by an amount equal to the thickness of the book. In the middle of the image capturing, movable range A is restricted by an amount equal to the thickness of remaining uncaptured pages. Accordingly, pressing periods during which the adhesion roller 4 presses a page are different between that in the beginning of the image capturing and that in the end of the image capturing by an amount equal to a difference between distance 13 in FIG. 6B and distance C in FIG. 6C.

FIG. 7A and FIG. 7B are timing charts for describing a conventional page turning operation. In FIG. 7A and FIG. 7B describing the conventional page turning operation, (i) control signals IN1 and IN2 for an arm motor control section and (ii) electric currents in the arm motor in the beginning and end of image capturing are shown. In FIG. 7A and FIG. 7B, a rotation when the arm section 1 is driven and rotated from the start point SP to the adhesion point AP1 (AP2) is referred to as "normal rotation", and a rotation when the arm section 1 is driven and rotated from the adhesion point AP1 (AP2) to the start point SP is referred to as "reverse rotation".

In the case where the arm section 1 is driven and rotated from the start point SP to the adhesion point AP1 (AP2), control signal IN1 for the arm motor control section is set at "high level" and control signal IN2 is set at "low level" so that the arm motor performs "normal rotation". Here, electric current in the arm motor gradually becomes small from the start of the driving until the adhesion roller 4 comes in contact with a page of the book 3. Then, when the adhesion roller 4 comes in contact with the page of the book 3, the arm section 1 is forcibly stopped, whereby an overcurrent is applied to the arm motor.

In general, in order to protect the arm motor from continuous overcurrent, a limiter for cutting the value of overcurrent to a predetermined value (1 A in the drawing) is operated. Then, by setting control signal IN1 for the arm motor control section at "high level" and setting control signal IN2 at "low level", the arm motor control section causes the arm motor to perform "reverse rotation" so that the arm section 1 is driven and rotated from the adhesion point AP1 (AP2) to the start point SP. The above-described period during which overcurrent continues corresponds to a pressing period (locking period) during which the adhesion roller 4 presses a page of the book 3.

In the beginning of the image capturing, many remaining uncaptured pages are present on the adhesion point AP1 (AP2) side, as shown in FIG. 6B. Therefore, a driving period from the start point SP to the adhesion point AP1 (AP2) is 0.4 s–tPREM, and a pressing period (locking period) Ts during which overcurrent continues is 0.5 s+tPREM, as shown in FIG. 7A. Note that "tPREM" is a variable time based on the number of remaining uncaptured pages.

On the other hand, at the end of the image capturing, there are no remaining uncaptured pages on the adhesion point AP1 (AP2) side, as shown in FIG. 6C. Therefore, a driving period from the start point SP to the adhesion point AP1 (AP2) is 0.4 s, and a pressing period (locking period) Te during which overcurrent continues is 0.5 s.

As such, in the conventional page turning apparatus, there is a problem in that the locking period of the arm motor, or in other words, the pressing periods Ts and Te during which the adhesion roller 4 presses a page change depending on the thickness of the book, and the adhesion force of the adhesion roller 4 with respect to the page also changes. This problem becomes more apparent in the case of a thick book having many pages.

Also, the pressing periods Ts and Te during which the adhesion roller 4 presses a page cannot be controlled, and therefore the consumption of electric current is increased in the beginning of image capturing where the locking period of the arm motor that drives the arm section 1 is long, which extremely shortens the life spans of the brush and the coil of the arm motor.

SUMMARY OF THE INVENTION

In accordance with one aspect of the present invention, there is provided an apparatus for turning a page of an opened book, comprising: an arm section which has an adhesion member provided on a tip end portion; a driving section which reciprocates the adhesion member via the arm section; a detection section which detects an overcurrent applied to the driving section; and a control section which controls timing at which the adhesion member that is reciprocated by the driving section starts reverse rotation, wherein the control section, when reversing a moving direction of the adhesion member from a direction toward a starting point of page turning to a direction toward an end point of the page turning, reverses the moving direction based on detection timing of the overcurrent by the detection section.

In accordance with another aspect of the present invention, there is provided a method for turning a page of an opened book, comprising: reciprocating an adhesion member via an arm section detecting an overcurrent applied to a motor for moving the arm section; and reversing a moving direction of the adhesion member based on detection timing of the overcurrent, when reversing the moving direction from a direction toward a starting point of page turning to a direction toward an end point of the page turning.

The above and further objects and novel features of the present invention will more fully appear from the following detailed description when the same is read in conjunction with the accompanying drawings. It is to be expressly understood. however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 3A and FIG. 3B are timing charts for describing the page turning operation of the page turning apparatus according to the first embodiment;

DETAILED DESCRIPTION OF THE PREFERRED EMBODIMENTS

Embodiments of the present invention will hereinafter be described with reference to the drawings.

A. First Embodiment

Figure 1:
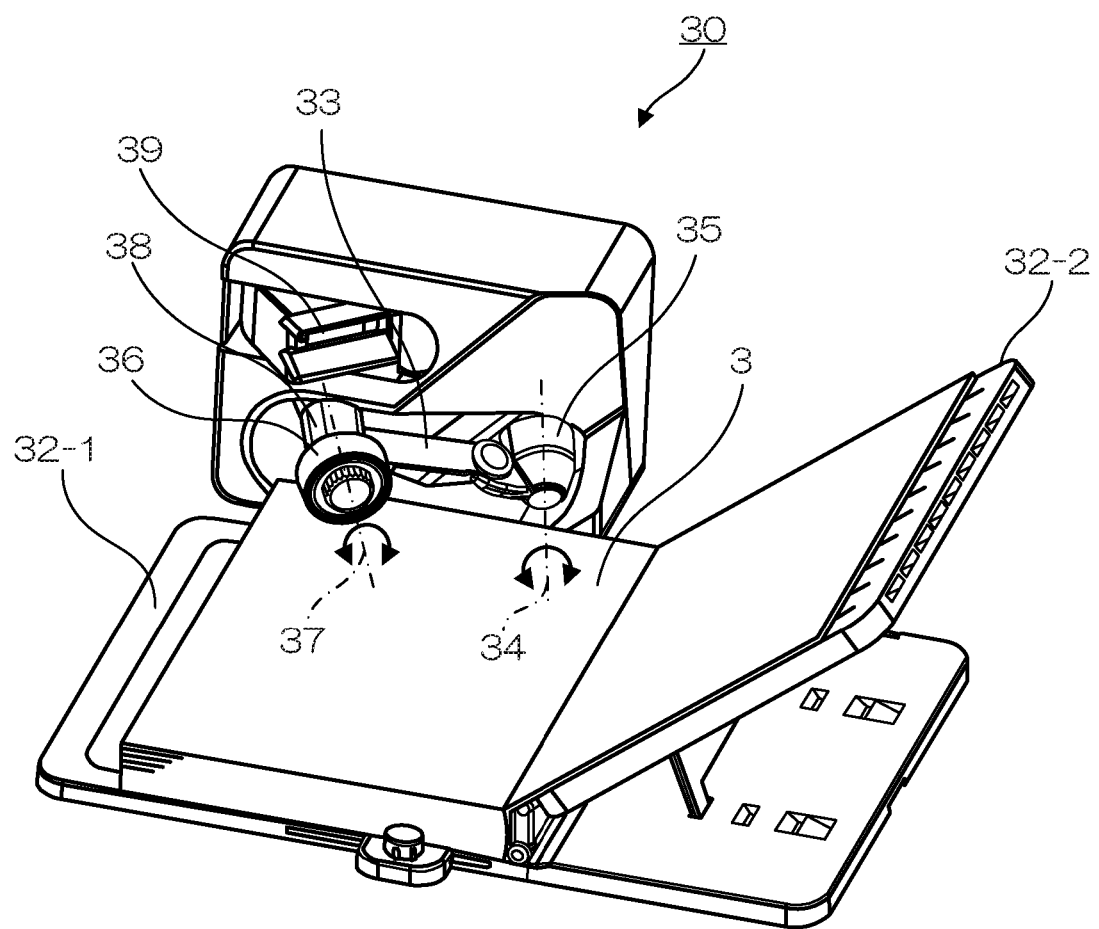
FIG. 1 is a perspective view of the outer appearance of a page turning apparatus according to a first embodiment of the present invention.

FIG. 1 is a perspective view of the outer appearance of a page turning apparatus according to a first embodiment of the present invention. The page turning apparatus 30 in FIG. 1 includes book stands 32-1 and 32-2 where a book 3 is placed, an arm section 33, an arm motor 35 that drives the arm section 33 with its driving shaft 34 as the center, an adhesion roller 36 attached to a tip end portion of the arm section 33, an adhesion roller motor 38 that rotates the adhesion roller 36 with its driving shaft 37 as the center, and an assist fan 39 for detaching a page from the adhesion roller 36 by blowing air to the page adhered to the adhesion roller 36. In a method according to the first embodiment, each page is turned over by the adhesion roller 36 attached to the tip end portion of the arm section 33 being adhered to a page surface of the book 3 and the arm section 33 being rotated in the opposite direction.

Figure 2:
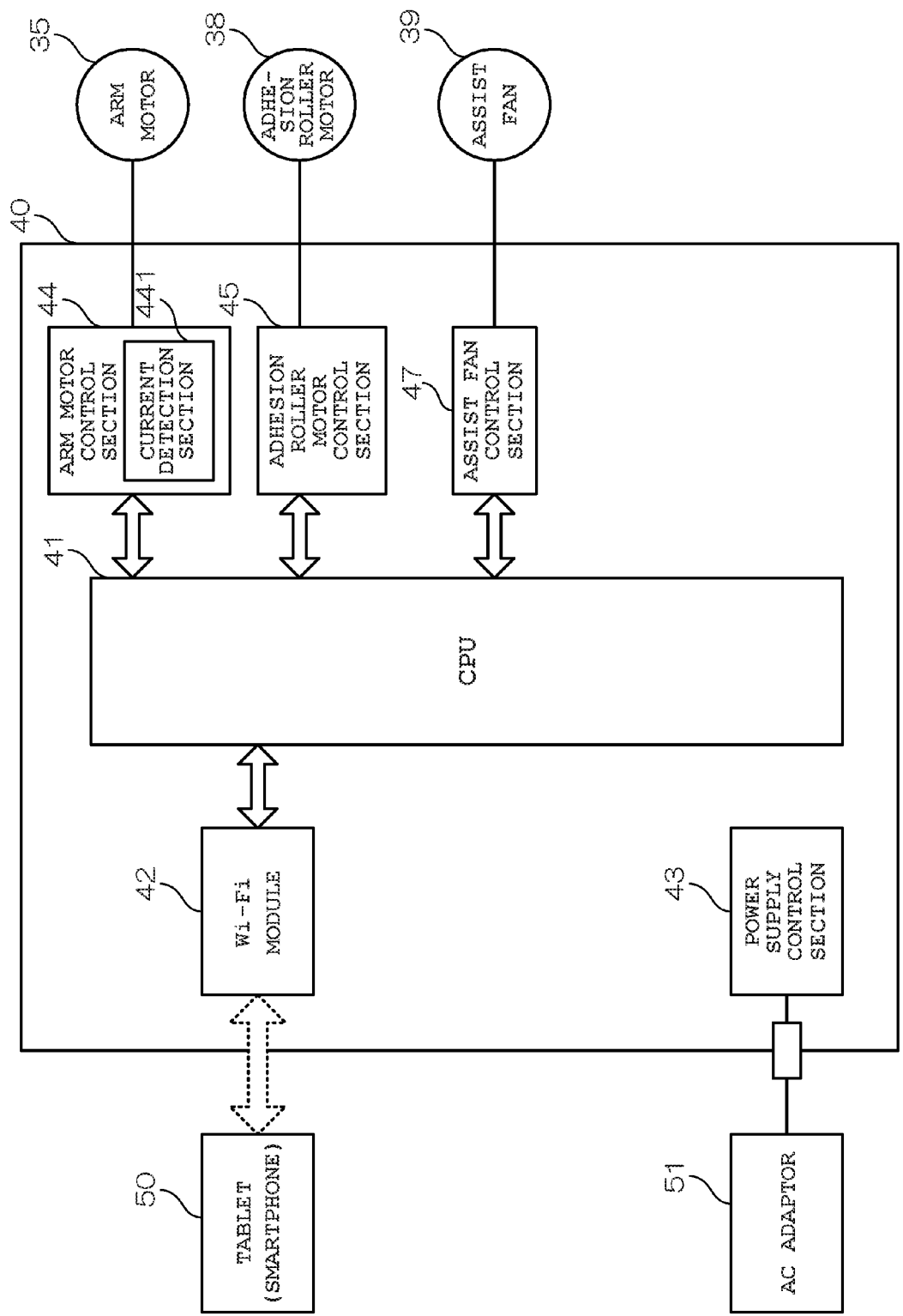
FIG. 2 is a block diagram showing the structure of the page turning apparatus according to the first embodiment, such as a control circuit and a peripheral drive system thereof.

FIG. 2 is a block diagram showing the structure of the page turning apparatus according to the first embodiment, such as a control circuit and a peripheral drive system thereof. Note that sections corresponding to those in FIG. 1 are provided with the same reference numerals. A control circuit 40 of the page turning apparatus 30 in FIG. 2 includes a CPU (Central Processing Unit) 41, a Wi-Fi (Wireless Fidelity) module 42, a power supply control section 43, an arm motor control section 44, an adhesion roller motor control section 45, and an assist fan control section 47.

The Wi-Fi module 42 is connected to a tablet (smartphone) 50 by Wi-Fi communication. When a start command is received from the tablet (smart phone) 50 via the Wi-Fi module 42, the CPU 41 starts a page turning operation, and transmits a signal for turning a page to the tablet (smart phone) 50 every time a page is turned over. Here, every time this page turning signal is received from the CPU 41 via the Wi-Fi module 42, the tablet (smart phone) 50 photographs a page of the book by its built-in imaging section (not shown). The power source control section 43 supplies direct-current voltage from an external AC/DC adaptor 51 to each section of the control circuit 40.

The arm motor control section 44 controls the operation of the arm motor 35 that drives the arm section 33 for pressing the adhesion roller 36 against a page of the book 3 so as to turn over the page. This arm motor control section 44 includes a current detection section 441. Upon detecting an overcurrent in the arm motor 35 (which is limited to, for example, 1 A by a limiter), the current detection section 441 lowers the level of a current limit notice CULMTn which is normally at high level to a low level. The adhesion roller motor control section 45 controls the operation of the adhesion roller motor 38 that rotates the adhesion roller 36 with the driving shaft 37 shown in FIG. 1 as the center when the adhesion roller 36 and paper are detached.

The assist fan control section 47 controls the operation of the assist fan 39 that blows air to a page adhered to the adhesion roller 36 and turned over by the rotation of the arm section 33 so that the page is detached from the adhesion roller 36.

The CPU 41 performs the integration control of the above-described sections Specifically, when a falling edge of a current limit notice CULMTn indicating the detection of an overcurrent by the current detection section 441 is detected in a page turning operation, the CPU 41 controls a pressing period (locking period) during which the adhesion roller 36 is pressing a page by performing drive control such that the arm motor 35 is rotated backward by the arm motor control section 44.

FIG. 3A and FIG. 3B are timing charts for describing the page turning operation of the page turning apparatus according to the first embodiment. First, the user fixes the book 3 on the book stand 32-1 of the page turning apparatus 30, and subsequently gives an instruction to start a page turning operation by using the tablet (smartphone) 50. Upon receiving this start instruction for a page turning operation via the Wi-Fi module 42, the CPU 41 of the page turning apparatus 30 sets control signal IN1 for the arm motor control section 44 at "high level", and sets control signal IN2 at "low level" (time ta1). Then, in response to the control signals IN1 and IN2, the arm motor control section 44 causes the arm motor 35 to perform "normal rotation" so that the arm section 33 is driven and rotated from the start point SP to the adhesion point AP1 (AP2). Here, from the start of the driving until the adhesion roller 4 comes in contact with a page of the book 3, current in the arm motor 35 gradually becomes small.

Figure 6A:
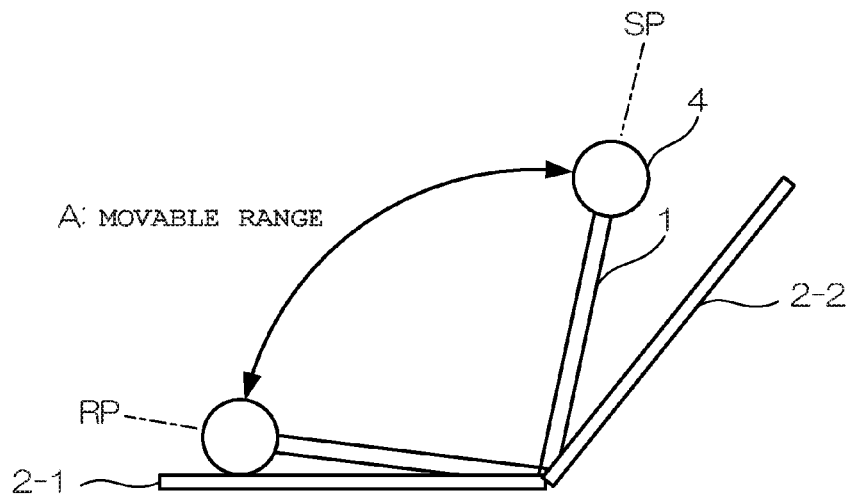
FIG. 6A, FIG. 6B, and FIG. 6C are schematic diagrams for describing the page turning operation of a conventional page turning apparatus.
Figure 6B:
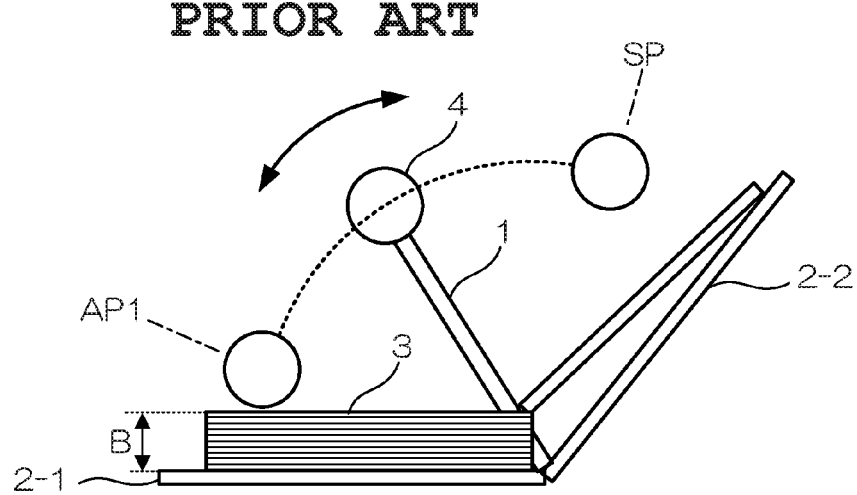

Then, when the arm section 33 reaches the return point RP side (time ta2), the adhesion roller 36 attached to the end portion of the arm section 33 presses the page of the book 3. Here, the pressed page adheres to the adhesion roller 36. The arm section 33 is stopped distance B short of the return point RP by the thickness of unturned pages of the book 3 (refer to FIG. 6B), and an overcurrent (limited to, for example, 1 A by the limiter) is applied to the coil of the arm motor 35 (from time ta2).

Upon detecting the overcurrent in the arm motor 35, the current detection section 441 lowers the level of the high-level current limit notice CULMTn to the low level (time ta3). In addition, at a falling edge of the current limit notice CULMTn indicating the detection of the overcurrent (for example, 1 A) by the current detection section 441, the CPU 41 sets control signal IN1 for the arm motor control section 44 at "low level", and sets control signal IN2 at "high level" (time ta4). Moreover, the arm motor control section 44 causes the arm motor 35 to perform "reverse rotation" (from time ta4) so that the arm section 33 is driven and rotated from the adhesion point AP1 to the start point SP.

Then, when the arm motor 35 performs "reverse rotation", the page adhering to the adhesion roller 36 of the arm section 33 is turned over. Subsequently, when the arm section 33 reaches the start point SP of the book stand 32-2 side, the adhering page is detached from the adhesion roller 36 and guided to the book stand 32-2 side by the rotation of the adhesion roller motor 38 by the adhesion roller motor control section 45 and air from the assist fan 39 by the assist fan control section 47.

Here, the CPU 41 transmits a page turning signal to the tablet (smartphone) 50 via the Wi-Fi module 42, and the tablet (smartphone) 50 photographs the page of the book 3 upon receiving the page turning signal.

Then, at predetermined timing, the CPU 41 of the page turning apparatus 30 drives and rotates the arm section 33 toward the book stand 32-1 side so as to return the arm section 33 and the adhesion roller 36 to the book stand 32-1 side, and repeats the above-described operations In the beginning of this consecutive image capturing, the above-described period between time ta2 and time ta3 during which an overcurrent is applied corresponds to a pressing period (locking period) Tls during which the adhesion roller 36 presses a page of the book 3.

Figure 6C:
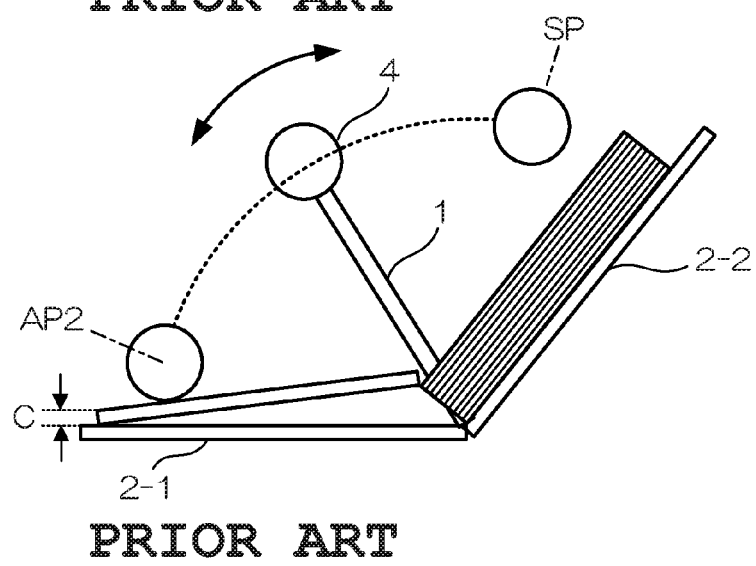
Figure 7A:
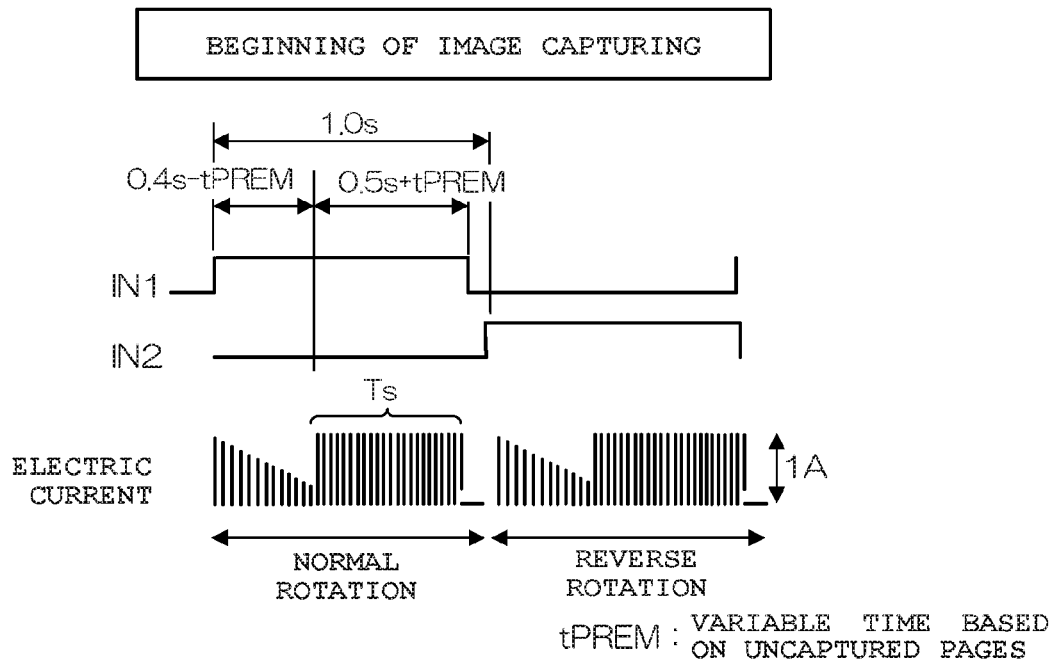
FIG. 7A and FIG. 7B are timing charts for describing the page turning operation of the conventional page turning apparatus.
Figure 7B:
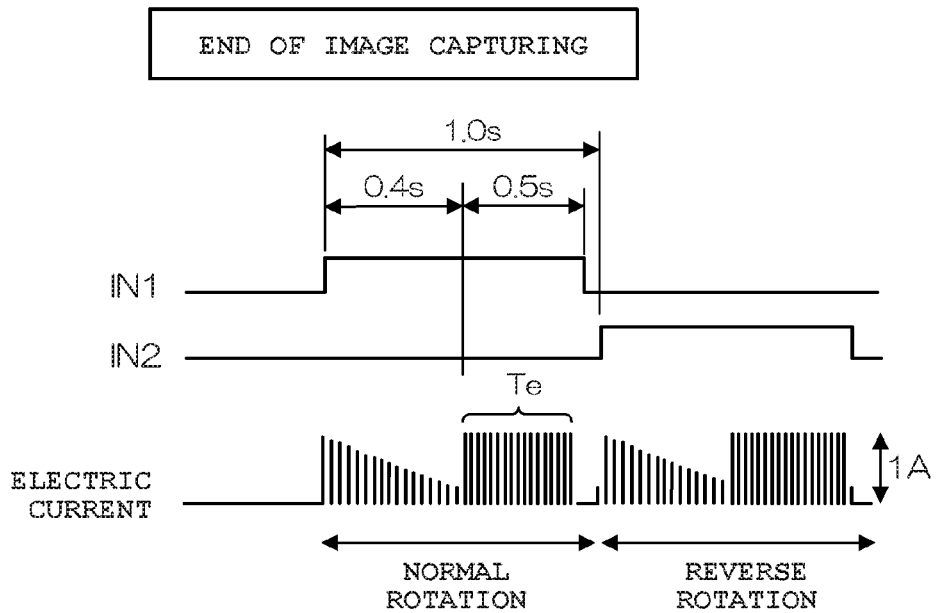

Similarly, at the end of the consecutive image capturing, the CPU 41 sets control signal IN1 for the arm motor control section 44 at "high level", sets control signal IN2 at "low level" (time tb1), and causes the arm motor 35 to perform "normal rotation" by the arm motor control section 44. In this case, since there are no remaining pages on the book stand 32-1 side, the arm section 33 reaches the adhesion point AP2 (return point RP) (refer to FIG. 6C; time tb2) In addition, an overcurrent (limited to, for example, 1 A by a limiter) is applied to the coil of the arm motor 35 (from time tb2).

Then, upon detecting the overcurrent in the arm motor 35, the current detection section 441 lowers the level of the high-level current limit notice CULMTn to the low level (time tb3). Subsequently, at a falling edge of the current limit notice CULMTn, the CPU 41 sets control signal IN1 for the arm motor control section 44 at "low level", and sets control signal IN2 at "high level" (time tb4). Then, the arm motor control section 44 causes the arm motor 35 to perform "reverse rotation" (from time tb4) so that the arm section 33 is driven and rotated from the adhesion point AP1 (AP2) to the start point SP.

In the end of the consecutive image capturing, the above-described period between time tb2 and time tb3 during which an overcurrent is applied corresponds to a pressing period (locking period) Tle during which the adhesion roller 36 presses a page of the book 3

According to the above-described first embodiment, the rotation of the arm motor 35 is changed from normal rotation to reverse rotation based on the current limit notice CULMTn indicating the detection of overcurrent in the arm motor 35 by the current detection section 441. As a result of this configuration, the pressing period Tls (locking period: time ta2 to time ta3) in the beginning of consecutive image capturing and the pressing period Tle (locking period: time tb2 to time tb3) in the end of the consecutive image capturing can be controlled to be substantially the same.

Also, according to the first embodiment, the rotation of the arm motor 35 is changed from normal rotation to reverse rotation based on the current limit notice CULMTn indicating the detection of overcurrent in the arm motor 35 by the current detection section 441. As a result of this configuration, the pressing period Tls (locking period: time ta2 to time ta3) during which the adhesion roller 36 presses a page of the book 3 in the beginning of consecutive image capturing can be shorten, whereby an increase in power consumption can be prevented, and the life spans of the brush and the coil of the arm motor 35 can be prevented from becoming extremely short.

In the first embodiment, by its configuration where the lengths of the pressing periods Tls and Tle are controlled to be substantially the same, a "normal rotation" driving period in a page turning operation is, for example, 1.0 s–tPREM in the beginning of consecutive image capturing, and 1.0 s in the end of the consecutive image capturing. That is, periods of time required for page turning are different between that in the beginning of image capturing and that in the end of the image capturing. Accordingly, in the first embodiment a page turning signal indicating the completion of each page turning operation is transmitted to the tablet (smartphone) 50 so as to indicate photographing timing for the tablet (smartphone) 50 side, whereby its convenience is not hampered.

In the configuration of the first embodiment transition to a next page turning operation is made regardless of whether a photographing operation by the tablet (smartphone) 50 has been completed. However, a configuration may be adopted in which transition to a next page turning operation is made when an instruction to end image capturing is transmitted from the tablet (smartphone) 50 and received by the page turning apparatus 30.

B. Second Embodiment

Next, a second embodiment of the present invention is described.

Figure 4:
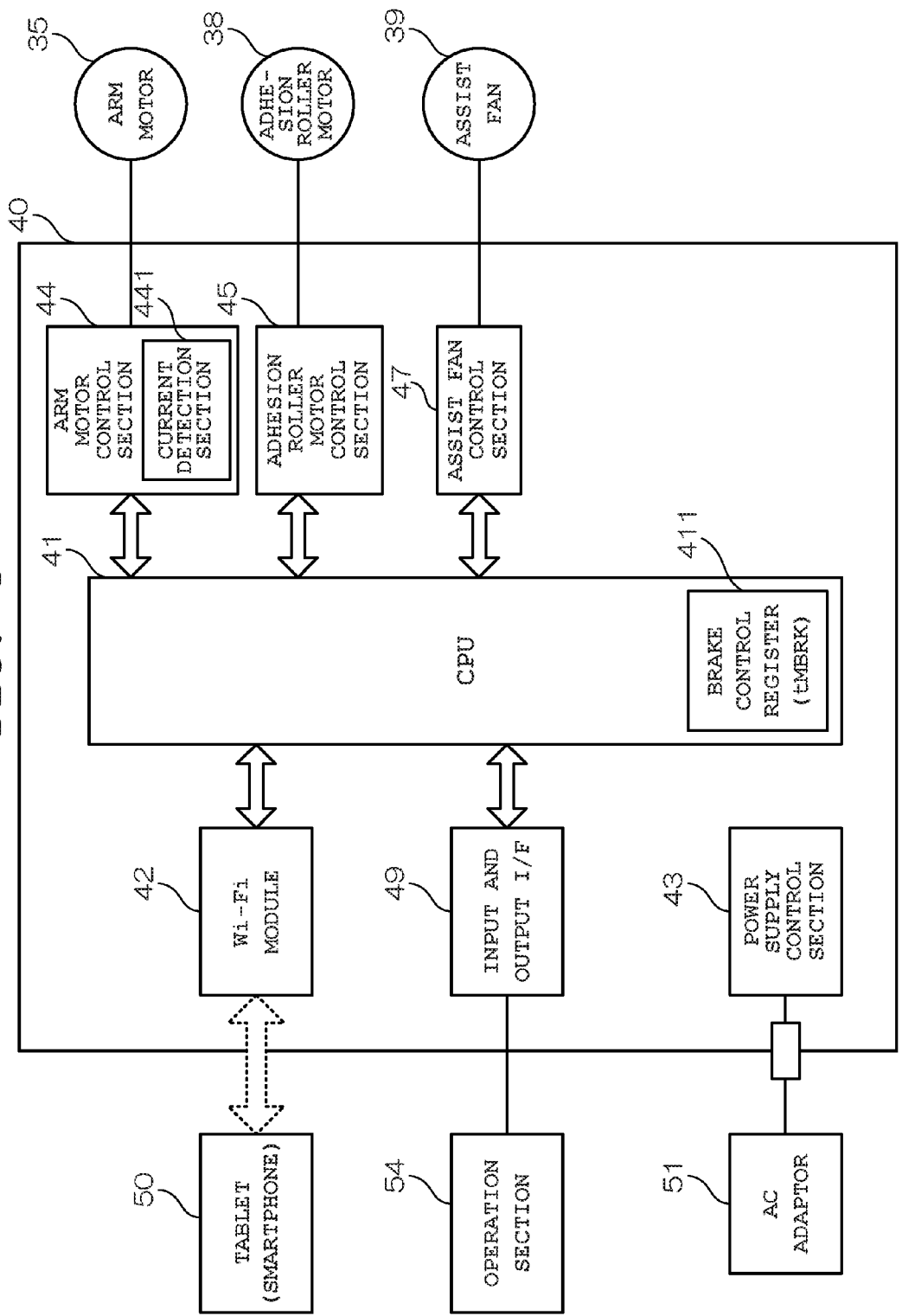
FIG. 4 is a block diagram showing the structure of a page turning apparatus according to a second embodiment, such as a control circuit and a peripheral drive system thereof.

FIG. 4 is a block diagram showing the structure of a page turning apparatus according to the second first embodiment such as a control circuit and a peripheral drive system thereof. Note that sections corresponding to those of FIG. 2 are provided with the same reference numerals and explanations thereof are omitted. An input and output I/F (Interface) 49 in FIG. 4 inputs an operation signal from an operation section 54. This operation section 54 is constituted by a power switch and various switches such as a page turning start switch. In particular, in the second embodiment, the operation section 54 includes a selection key for inputting the paper type (for example, low-quality paper, regular paper, or high-quality paper) of a book.

The CPU 41 sets a brake applying period tMBRK in a brake control register 411 based on the paper type of a book inputted from the operation section 54. Note that this brake applying period tMBRK is determined in advance based on each paper type of books. More specifically, this brake applying period tMBRK becomes longer in the order of low-quality paper (long), regular paper, and high-quality paper. When an overcurrent is detected by the current detection section 441 during a page turning operation, the CPU 41 controls the pressing period during which the adhesion roller 36 is pressing the page, based on the set brake applying period tMBRK.

Figure 5:
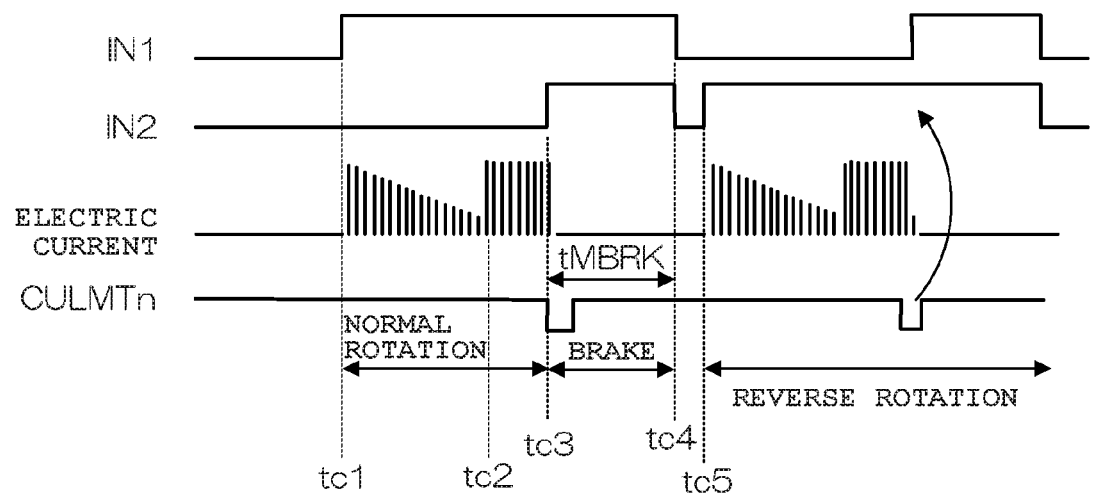
FIG. 5 is a timing chart for describing the page turning operation of the page turning apparatus according to the second embodiment.

FIG. 5 is a timing chart for describing the page turning operation of the page turning apparatus according to the second embodiment. First, the CPU 41 of the page turning apparatus 30 sets a brake applying period tMBRK in the brake control register 411 based on the paper type of a book inputted from the operation section 54. Then, upon receiving an instruction to start a page turning operation via the Wi-Fi module 42, the CPU 41 sets control signal IN1 for the arm motor control section 44 at "high level", and sets control signal IN2 at "low level" (time tc1). Then, in response to these control signals IN1 and IN2, the arm motor control section 44 causes the arm motor 35 to perform "normal rotation" so as to drive and rotates the arm section 33 from the start point SP to the adhesion point AP1 (AP2).

When the arm section 33 reaches the return point RP side (time tc2), the adhesion roller 36 attached to the end portion of the arm section 33 presses a page of the book 3, whereby the page adheres to the adhesion roller 36. Here, an overcurrent (restricted to, for example, 1 A by a limiter) is applied to the coil of the arm motor 35 (from time tc2).

Next, upon detecting the overcurrent in the arm motor 35, the current detection section 441 lowers the level of the high-level current limit notice CULMTn to the low level (time tc3). Subsequently, upon detecting a falling edge of the current limit notice CULMTn, the CPU 41 sets control signal IN1 for the arm motor control section 44 to be at "high level" and control signal IN2 to be at "high level" for a period corresponding to the brake applying period tMBRK set in the brake control register 411 (time tc3 to time tc4).

When control signal IN1 is set at "high level" and control signal IN2 is set at "high level", the arm motor control section 44 shunts the input end of the arm motor 35, and applies a brake to the arm motor 35 so that the arm motor 35 is not rotated. That is, in a period between time tc3 to time tc4, a brake is applied to the arm motor 35 so that it is not rotated by external force, whereby the page can be unfailingly adhered to the adhesion roller 36.

Then, when the brake applying period tMBRK elapses, the CPU 41 sets control signal IN1 for the arm motor control section 44 at "low level", and sets control signal IN2 at "high level" (time tc5). In addition, the arm motor control section 44 causes the arm motor 35 to perform "reverse rotation" so that the arm section 33 is rotated from the adhesion point AP1 (AP2) to the start point SP (from time tc5). Note that operations hereafter are the same as those of the first embodiment and therefore explanations thereof are omitted.

According to the above-described second embodiment, the pressing period Tis in the beginning of image capturing (locking period: time ta2 to time ta3) and the pressing period Tle in the end of the image capturing (locking period: time tb2 to time tb3) can be substantially the same, or the pressing period Tls (locking period: time ta2 to time ta3) during which the adhesion roller 36 presses a page of the book 3 in the beginning of image capturing can be shorten, whereby an increase in power consumption can be prevented, and the life spans of the brush and the coil of the arm motor 35 can be prevented from becoming extremely short.

Also, according to the second embodiment, a brake is applied to the arm motor 35 with the adhesion roller 36 pressing a page of the book 3, based on the brake applying period tMBRK set according to the paper type (for example, low-quality paper, regular paper, or high-quality paper) of the book. Therefore, pages can be unfailingly adhered to the adhesion roller 36 even when a different type of book is photographed.

In the second embodiment, the brake applying period tMBRK is set according to the paper type (for example, low-quality paper, regular paper, or high-quality paper) of a book. However it may be set by setting an arbitrary period by the tablet (smartphone) 50.

While the present invention has been described with reference to the preferred embodiments, it is intended that the invention be not limited by any of the details of the description therein but includes all the embodiments which fall within the scope of the appended claims.

What is claimed is:

1. An apparatus for turning a page of an opened book, comprising:
    an arm section which has an adhesion member provided on a tip end portion;
    a driving section which reciprocates the adhesion member via the arm section;
    a detection section which detects an overcurrent applied to the driving section; and
    a control section which controls a timing at which the adhesion member that is reciprocated by the driving section starts a reverse movement,
    wherein the control section, when reversing a moving direction of the adhesion member from a direction toward a starting point of page turning to a direction toward an end point of the page turning, reverses the moving direction when a predetermined amount of time has elapsed after detection of the overcurrent by the detection section.

2. The apparatus according to claim 1, further comprising:
an input section which is used to input a paper type of the page,
wherein the control section changes the predetermined amount of time based on the inputted paper type.

3. The apparatus according to claim 1, further comprising:
an interface which interfaces with an external apparatus,
wherein the control section acquires information indicating the predetermined amount of time from the external apparatus via the interface.

4. The apparatus according to claim 1, wherein the control section stops operation of the driving section until the predetermined amount of time has elapsed after detection of the overcurrent.

5. A method for turning a page of an opened book, comprising:
reciprocating an adhesion member via an arm section
detecting an overcurrent applied to a motor for moving the arm section; and
when reversing a moving direction of the adhesion member from a direction toward a starting point of page turning to a direction toward an end point of the page turning, reversing the moving direction of the adhesion member when a predetermined amount of time has elapsed after detection of the overcurrent.

6. The method according to claim 5, further comprising:
inputting a paper type of the page; and
changing the predetermined amount of time based on the inputted paper type.

7. The method according to claim 5, further comprising:
acquiring information indicating the predetermined amount of time from an external apparatus via an interface.

8. The method according to claim 5, further comprising:
stopping operation of the motor until the predetermined amount of time has elapsed after detection of the overcurrent.

* * * * *